Jan. 16, 1951 N. H. YOUNG, JR 2,538,071
TELEVISION SYSTEM
Filed April 12, 1946
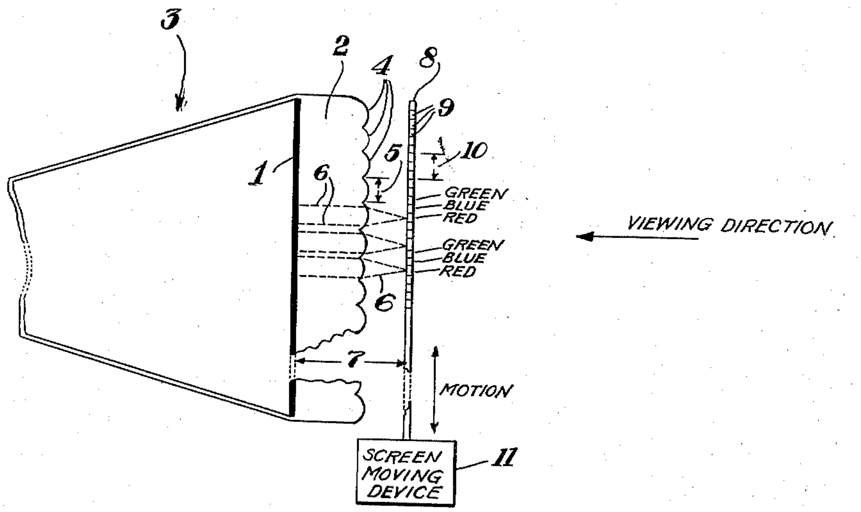
INVENTOR.
NORMAN H. YOUNG, JR.
BY
R P Morris
ATTORNEY Patented Jan. 16, 1951

2,538,071

UNITED STATES PATENT OFFICE 2,538,071

TELEVISION SYSTEM

Norman H. Young, Jr., Jackson Heights, N. Y., assignor to Federal Telephone and Radio Corporation, New York, N. Y., a corporation of Delaware Application April 12, 1946, Serial No. 661,495

1 Claim. (Cl. 178—5.4)

This invention relates to color television systems and, more specifically, to a light filtering system for the color reproduction of televised images.

Television program reproduction in color is accomplished in many well-known arrangements by interposing color filters between the white fluorescent screen of a cathode ray tube and the observer position. Such color television systems operate in accordance with these fundamental principles: the scene to be transmitted is televised successively through tri-color filters which permit passage of light of one of three colors to the television pick-up or "camera" tube during the interval required for once scanning a complete image produced within the tube; video signals including picture components which are successively responsive to only one color in the televised scene are transmitted from the pick-up location, the picture components being responsive to the three colors in a specific sequence; the television receiving equipment reproduces in black and white each of the picture components which represents the distribution of a single color in any scene; and a mechanical filtering arrangement interposes colored filters between the cathode ray tube and the position of an observer such that, with the advantages resulting from the visual retention of the human eye, the color distribution of the original scene is substantially regained, it being required that the color filter through which the received pictures are observed during any interval must correspond in color with the filter through which the scene is being televised during the same interval.

The color filters employed in many television receivers of the foregoing type comprise large tri-color discs which are rotated at high speeds, and it is to the elimination of such a disc arrangement that the present invention is directed. The structure proposed herein involves a cathode ray tube screen which is shaped into a plurality of adjacent narrow-width cylindrical lenses having a pitch substantially smaller than the smallest picture element to be reproduced. These lenses act to concentrate the light from the fluorescent screen in narrow strips at a specified short distance in front of the face of the tube. At the locus of the plane defined by these narrow strips or focal points the color filters of this invention are introduced. The filters consist of thin strips of red, blue-violet, and green filter material with a pitch from one color to the next strip of the same color equal to the pitch of the cylindrical lenses. At any given time the light from the cathode ray tube screen may be made to pass through filters of one color only, and by moving the filters a very small distance in their own plane the light may be made to pass through filters of a different color. The desired color images may be reproduced if the filter screen is moved in such a manner that, during the interval the televised scene is picked-up with response to any one of the three colors involved, the filter screen allows light of the same color to be passed therethrough.

It should be clear, therefore, that one of the objects of the present invention is to provide a television color image reproducing arrangement wherein large rotating filter discs are eliminated.

A second object is to provide a television color image reproducing system wherein only small movements of a color filter arrangement are required.

Further, it is an object of this invention to provide, for use in a color television receiver, a color filter changing system wherein each picture element of the reproduced image is filtered by a plurality of minute filters simultaneously.

A still further object is to provide a color filtering system, for use in a color television arrangement, in which the filter screen is moved in a reciprocating fashion in a plane substantially parallel to the screen of the associated cathode ray tube.

The above-disclosed features and objects may be more clearly understood and other and further objects and features should become apparent from the description and discussion of a preferred embodiment of this color television system which follows, reference being had to the drawing in which the color filtering arrangement required between the screen of a cathode ray tube and the image viewing or observer position is shown in a partial sectional side elevation.

Fluorescent screen 1 on the molded glass face 2 of a cathode ray tube 3 is caused to emit white light when an electron picture-tracing beam impinges upon it. Narrow cylindrical lenses 4 are molded on the uncoated side of the glass face 2 of the tube, the pitch 5 being substantially smaller than the smallest picture element it is desired to reproduce. As indicated by the dashed lines 6 the action of the cylindrical lenses is to concentrate the light from screen 1 in narrow strips at a common distance 7 in front of the fluorescent screen. At this distance the filter screen 8 is positioned.

The filter screen is comprised of narrow strips of color filter material 9 which will transmit red, blue and green light, said strips being arranged in a definite sequence such as that labeled on the figure and having a pitch 10 from one strip to the next of the same color which is equal to the cylindrical lens pitch 5. It should be noted that the strip arrangement is such that for any particular vertical position of the filter screen all the light transmitted therethrough will be of one color. The filter screen is movable in the vertical directions noted on the drawing by a filter screen moving device 11 which should be so synchronized with the received television signals that the operation of the system is in accordance with the principles related previously. The motion of the screen should be at a uniform rate downward for a period substantially equal to the time required for tracing any one image in black and white responsive to all three colors and then at a very rapid rate upward to the position from which downward motion starts. A plot of the displacement of any point on the screen from its highest position versus time would therefore appear as an inverted sawtooth graph. One arrangement for producing the motion described might involve a cam and follower, the cam being designed to impart the sawtooth movements to the follower which is rigidly attached to the filter screen. Well known means, such as an induction type motor synchronized by means of a phonic motor or a magnetic brake, might be employed to rotate the cam at a proper speed and in synchronism with the received television signals.

Any device which is capable of producing the required small vertical and synchronized movements may be readily adapted for use with this system. Also, it may be possible to construct an endless flexible filter screen of the prescribed type and drive this screen at a uniform speed to accomplish the filtering of this invention. The location of this moving device may, of course, be other than as shown in the drawing, provided the results produced are essentially as described. It should be apparent then that many changes may be made in the disclosed embodiment by those skilled in the art without departing in spirit or principle from the present invention and the scope thereof should therefore not be considered limited by the illustration and discussion of a single preferred embodiment.

I claim:

In a system for producing color television images from black and white images each formed over the entire image face of the fluorescent screen of a cathode ray tube wherein each black and white image represents the distribution of certain color in a televised scene and occurs in a definite sequence, a cathode ray tube, a plurality of parallel elongated lenses, means positioning said lenses adjacent said screen whereby said lenses concentrate the white light from each picture line into narrow strips each spaced a given distance from an adjacent strip and each lying substantially in a plane including the focal points of said lenses, filter means lying substantially in said plane and comprising a screen having a plurality of elongated elements of color filtering material arranged parallel to said lenses in a specific color sequence, said elements having a pitch from a strip of one color to the next strip of the same color equal to said given distance between adjacent light strips, and means to move said filter relative to said lenses, said means for moving said filter being adapted to be synchronized with the received images for registering at any instant the filtering strips of one color corresponding to one black and white image with said strips of white light to transmit light of said one color in correspondence with the distribution of said one color in the televised scene.

NORMAN H. YOUNG, Jr.

REFERENCES CITED

The following references are of record in the file of this patent:

UNITED STATES PATENTS

| Number | Name | Date |
|---|---|---|
| 2,296,908 | Crosby | Sept. 29, 1942 |
| 2,337,980 | Du Mont | Dec. 28, 1943 |
| 2,389,979 | Huffnagle | Nov. 27, 1945 |
| 2,415,059 | Zworykin | Jan. 28, 1947 |

FOREIGN PATENTS

| Number | Country | Date |
|---|---|---|
| 458,791 | Great Britain | Dec. 28, 1936 |